(12) United States Patent
Ginger et al.

(10) Patent No.: US 11,107,074 B2
(45) Date of Patent: Aug. 31, 2021

(54) METHOD, APPARATUS AND SYSTEM FOR ELECTRONIC PAYMENTS

(71) Applicant: IPCO 2012 LIMITED, London (GB)

(72) Inventors: Daniel Ginger, Rickmansworth (GB); Christopher Kendall, Rickmansworth (GB)

(73) Assignee: IPCO 2012 LIMITED, London (GB)

( * ) Notice: Subject to any disclaimer, the term of this patent is extended or adjusted under 35 U.S.C. 154(b) by 316 days.

(21) Appl. No.: 16/311,458

(22) PCT Filed: Jun. 29, 2017

(86) PCT No.: PCT/GB2017/051901
§ 371 (c)(1),
(2) Date: Dec. 19, 2018

(87) PCT Pub. No.: WO2018/002625
PCT Pub. Date: Jan. 4, 2018

(65) Prior Publication Data
US 2020/0311722 A1    Oct. 1, 2020

(30) Foreign Application Priority Data

Jun. 30, 2016 (GB) ..................................... 1611399

(51) Int. Cl.
*G06Q 20/38* (2012.01)
*G06F 16/27* (2019.01)
(Continued)

(52) U.S. Cl.
CPC .......... *G06Q 20/385* (2013.01); *G06F 16/23* (2019.01); *G06F 16/27* (2019.01); *G06Q 10/10* (2013.01);
(Continued)

(58) Field of Classification Search
CPC .... G06Q 20/385; G06Q 20/27; G06Q 20/108; G06Q 40/02; G06F 16/27; G06F 16/23
(Continued)

(56) References Cited

U.S. PATENT DOCUMENTS 8,346,659 B1 * 1/2013 Mohsenzadeh ........ G06Q 20/00
705/39
8,566,168 B1 * 10/2013 Bierbaum .............. G06Q 20/20
705/17
(Continued)

OTHER PUBLICATIONS

"International Search Report and Written Opinion Issued in International Application No. PCT/GB2017/051901", dated Aug. 22, 2017, 9 pages.

*Primary Examiner* — Robert R Niquette
(74) *Attorney, Agent, or Firm* — Talem IP Law, LLP

(57) ABSTRACT

A system for allowing electronic payments through use of a unique proxy includes a first server, a first registration database and a first lookup database. The first server receives an electronic registration request message, including registration information of a first user, from a financial institution of the first user. The first registration database then copies a subset of the registration information, including a unique proxy of the first user, to the first lookup database as the first user's lookup information. When the first server receives an electronic proxy payment request message, including the unique proxy of the first user, from a financial institution of a second user, the first server looks up the first user's lookup information in the first lookup database on the basis of the unique proxy of the first user and transmits the first user's lookup information to the financial institution of the second user.

20 Claims, 7 Drawing Sheets

(51) Int. Cl.
*G06Q 20/02* (2012.01)
*G06Q 20/10* (2012.01)
*G06Q 40/02* (2012.01)
*G06F 16/23* (2019.01)
*G06Q 10/10* (2012.01)
*H04L 12/741* (2013.01)

(52) U.S. Cl.
CPC ......... *G06Q 20/027* (2013.01); *G06Q 20/108* (2013.01); *G06Q 40/02* (2013.01); *H04L 45/54* (2013.01)

(58) Field of Classification Search
USPC ...................................................... 705/35–45
See application file for complete search history.

(56) References Cited

U.S. PATENT DOCUMENTS

| | | | |
|---|---|---|---|
| 10,679,213 B2* | 6/2020 | Tobin | G06Q 20/227 |
| 2007/0106612 A1* | 5/2007 | O'Brien | G06Q 20/023 |
| | | | 705/44 |
| 2008/0154772 A1* | 6/2008 | Carlson | G06Q 20/3223 |
| | | | 705/44 |
| 2011/0010293 A1* | 1/2011 | Giordano | G06Q 20/102 |
| | | | 705/39 |
| 2012/0116957 A1 | 5/2012 | Zanzot et al. | |
| 2012/0215693 A1* | 8/2012 | Faith | G06Q 20/027 |
| | | | 705/44 |
| 2012/0284175 A1* | 11/2012 | Wilson | G06Q 20/32 |
| | | | 705/39 |
| 2013/0036000 A1* | 2/2013 | Giordano | G06Q 20/385 |
| | | | 705/14.27 |
| 2015/0032623 A1* | 1/2015 | Friedman | G06Q 20/12 |
| | | | 705/44 |
| 2015/0073984 A1* | 3/2015 | Andrews | G06Q 20/384 |
| | | | 705/43 |
| 2015/0262160 A1* | 9/2015 | Hursta | G06Q 20/227 |
| | | | 705/14.51 |
| 2015/0371233 A1* | 12/2015 | Simakov | G06Q 20/3572 |
| | | | 705/44 |
| 2016/0125370 A1* | 5/2016 | Grassadonia | G06Q 20/386 |
| | | | 705/39 |
| 2017/0364910 A1* | 12/2017 | Malhotra | G06Q 20/40 |

* cited by examiner

| Display Name | Proxy | Bank Account No. | Bank Account Sort Code |
|---|---|---|---|
| User 1 | 07123456789 | 12345678 | 01-02-03 |
| User 2 | 07123456710 | 23456789 | 04-05-06 |
| | | | |
| | | | |
| | | | |
| | | | |

FIG. 2

METHOD, APPARATUS AND SYSTEM FOR ELECTRONIC PAYMENTS

BACKGROUND

Field of the Disclosure

The present invention relates to a method, apparatus and system for Electronic Payments.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Electronic payments between bank accounts are commonplace in the modern world. Typically, such payments take place via an electronic payments service established between banks. A sender (or payer) can pay money to a receiver (or payee) by the sender instructing their bank to send an electronic message containing (amongst other information) information identifying the bank account from which money is to be paid, information identifying the bank account to which money is to be paid, and the amount of money to be paid. This message is then processed by the electronic payments service and, if successful, the money to be paid is debited from the bank account of the sender and credited to the bank account of the receiver. With modern systems such as Faster Payments®, money can be transferred in this way within a matter of seconds.

The problem with such electronic payments services, however, is that the sender must know and correctly enter the information identifying the bank account of the receiver. For example, the sender must know and correctly enter the bank account number and sort code of the receiver. Often, this information is not immediately available to the sender, and they will have to specifically enquire to the receiver so as to obtain this information. This can be problematic if the receiver cannot be contacted. Furthermore, this information is usually not in a format which is easily remembered by a sender. For example, remembering a bank account number and sort code requires remembering two separate, relatively long strings of numbers, a task which is difficult for most people. Furthermore, given that information such as bank account numbers and sort codes is quite sensitive and can potentially be used for abuse or fraud, potential receivers of money may be reluctant to share such information with others, meaning that payment via an electronic payments service is not possible. Also, even if a receiver does share such information with third parties so as to allow them to be paid, the fact that such information has been shared increases the risk of the receiver becoming a victim of fraud or abuse.

In order to alleviate the above mentioned problems, it has been suggested that a proxy may be used in place of bank account information. A proxy is unique information which is different to the bank account information and which, in itself, cannot easily be used for fraud or abuse. However, the proxy is set up with the electronic payment service so as to be representative of the bank account information. This way, if a receiver wishes to be paid by a third party, then all they must do is to give the proxy to the third party, rather than the bank account information. The third party may then instruct payment via the electronic payment service using the proxy. Advantageously, as well as being lower risk in terms of abuse or fraud, the proxy can be chosen to be information which is more likely to be known by or at least more easily available to the sender. For example, the proxy may be a mobile telephone number or the like.

However, implementing the use of proxies in an electronic payments service presents further issues. In particular, the use of a proxy results in an additional layer of information which must be effectively stored, managed and processed as part of the payments process so as to ensure that payments instructed on the basis of a proxy are handled securely, reliably and within a timescale which is acceptable to customers. The present invention thus aims to alleviate these issues.

SUMMARY

A system for allowing electronic payments through use of a unique proxy, the system comprising a first server, a first registration database and a first lookup database, wherein: the first server is operable to: receive an electronic registration request message from a financial institution of a first user, the electronic registration request message comprising registration information of the first user including bank account information identifying a bank account of the first user, an identifier of the first user, a unique proxy of the first user, and auxiliary information associated with the first user; and store the registration information of the first user in the first registration database; the first registration database is operable to copy a subset of the registration information of the first user to the first lookup database as lookup information of the first user, the lookup information including the bank account information of the first user, the identifier of the first user and the unique proxy of the first user; and the first server is operable to: receive an electronic proxy payment request message from a financial institution of a second user, the electronic proxy payment request message comprising the unique proxy of the first user; look up the lookup information of the first user in the first lookup database on the basis of the unique proxy of the first user comprised within the electronic proxy payment request message; and transmit the lookup information of the first user to the financial institution of the second user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 shows an example of lookup information according to an embodiment;

DESCRIPTION OF THE EMBODIMENTS

Figure 1:
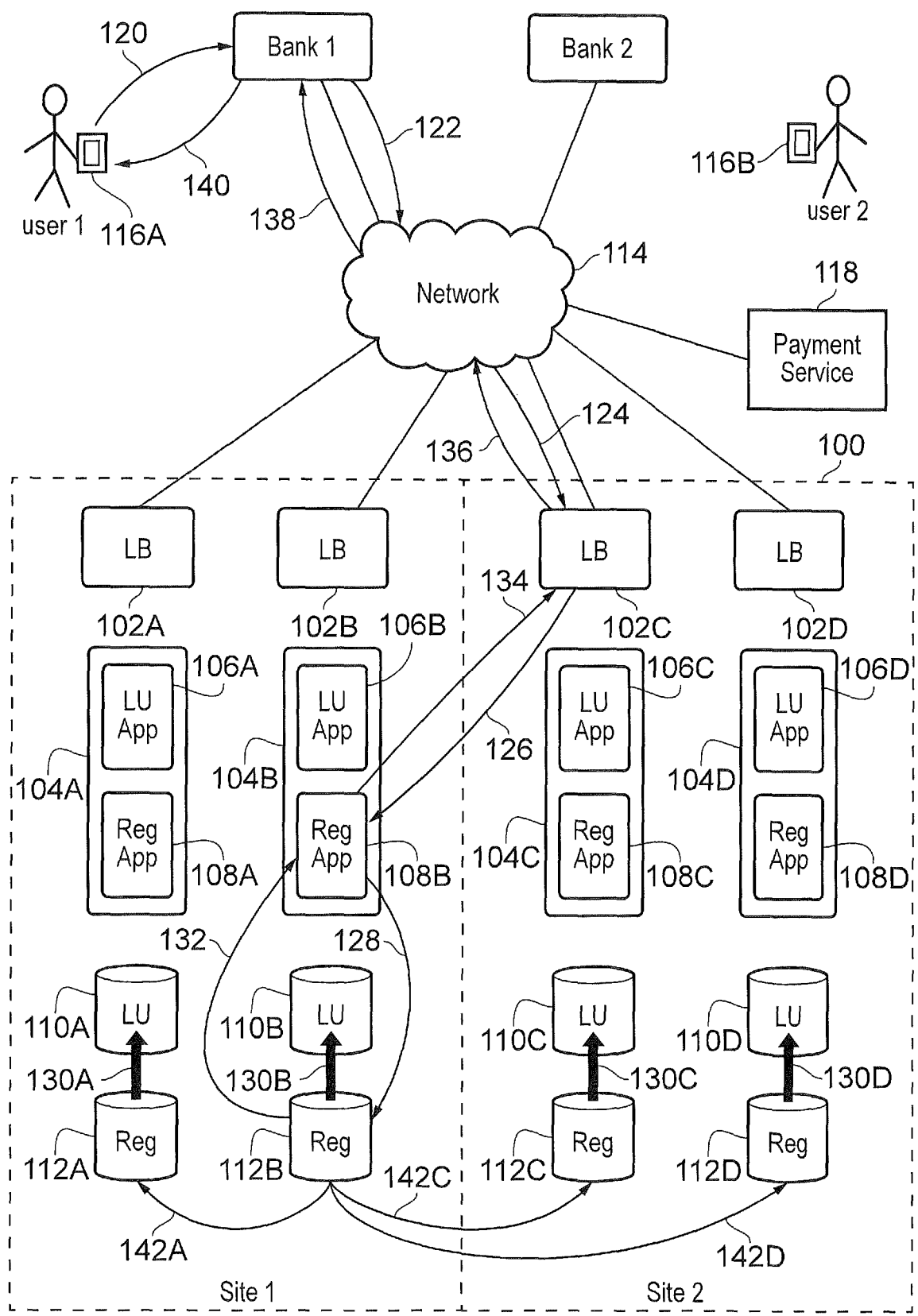
FIG. 1 shows a system according to an embodiment.

Referring now to the drawings, wherein like reference numerals designate identical or corresponding parts throughout the several views.

FIG. 1 shows a system 100 according to an embodiment of the present invention. Furthermore, FIG. 1 illustrates a registration process which, when completed, allows a user to start sending and receiving payments via a proxy using the system 100. The system 100 is configured to process at least two key types of message, these being registration request messages which allow a user to register with the system so that they can be paid through the use of a proxy and proxy payment request messages which allow registered users to be paid via their proxy.

The system 100 comprises a plurality of servers 104A-D, registration databases 112A-D and lookup databases 110A-D distributed over a plurality of sites. In the particular embodiment of FIG. 1, the servers, registration databases and lookup databases are distributed over two sites, with two servers 104A and B, two registration databases 112A and B and two lookup databases 110A and B present at a first site (site 1) and two servers 104C and D, two registration databases 112C and D and two lookup databases 110C and D present at a second site (site 2). Each of the servers 104A-D comprises a lookup application 106A-D and a registration application 108A-D, each of which may be implemented as a software application.

Each of the lookup applications 106A-D is configured to send and receive information from a respective one of the lookup databases 110A-D (so lookup application 106A is configured to send and receive information from lookup database 110A, lookup application 106B is configured to send and receive information from lookup database 110B, etc.). In addition, each of the registration applications 108A-D is configured to send and receive information from a respective one of the registration databases 112A-D (so registration application 108A is configured to send and receive information from registration database 112A, registration application 108B is configured to send and receive information from lookup database 112B, etc.). Furthermore, each of the lookup databases 110A-D is connected to a respective one of the registration databases 112A-D (so lookup database 110A is connect to registration database 112A, lookup database 110B is connected to registration database 112B, etc.). This allows selected data from each registration database to be copied to the lookup database connected to it. The copying of selected data from a registration database to its corresponding lookup database is carried out under control of the appropriate registration application (so that registration application 104A controls the transfer of selected data from registration database 112A to lookup database 110A, registration application 104B controls the transfer of selected data from registration database 112B to lookup database 112A, etc.).

The servers 104A-D are connected to a network 114 via load balancers 102A-D. The load balancers (which are an example of routing units and which may be F5® load balancers, for example) direct electronic messages (including registration request messages, proxy payment request messages and update request messages, as explained below) received over the network to the servers 104A-D in such a way as to achieve an efficient distribution of electronic message processing amongst the servers (thus helping to avoid a situation in which a first server has a high number of messages to process where as a second server has few or no messages to process, meaning that messages sent to the first server for processing are unnecessarily delayed). The load balancers may direct each electronic message received over the network using any suitable method, such as a method in which each electronic message is transmitted to the server which, at the time, is likely to have the largest capacity to process the electronic message. For example, a least connection method may be used, in which each new request is directed to the server with the least number of active request processes. In addition, and as will be explained, the load balancers may be configured to direct particular electronic messages to one or more specific servers.

A plurality of participating banks (in this embodiment, bank 1 and bank 2) and are also connected to the network 114. This allows electronic messages to be transmitted between each bank and the system 100. In addition, a conventional electronic payments service (such as Faster Payments®), which allows electronic payment between bank accounts on the basis of convention bank account information (such as a bank account number and sort code) is connected to the network. As will be explained, such a service works together with the system 100 so as to allow secure, reliable and timely processing of electronic payments instructed on the basis of a proxy.

In order to make and receive payments using a proxy, a user must first register a proxy with the system 100. An embodiment of this process is now explained with reference to FIG. 1.

FIG. 1 illustrates a process by which a first user (user 1) registers a proxy for use with the system 100. The proxy must be a unique proxy, that is, a proxy which is unique to the first user and which has not previously been used by any other user of the system 100. A mobile telephone number of the first user is a suitable example of a unique proxy. User 1 registers electronically using a bank application provided by their bank (bank 1). In an embodiment, the bank application is a software application which is accessible to the user via an electronic device 116A such as a smartphone, tablet computer or laptop. For example, the bank application may be a downloadable software application (or "app") or may be accessible via a website or the like. In order to register, the user provides their chosen proxy (which, in this embodiment, is a mobile telephone number) to the bank application and instructs the bank application to associate bank account information of the user (such as a bank account number and sort code or, alternatively, a PAN number of a credit or debit card associated with the bank account) with the user's chosen proxy. For example, the user may select the bank account they wish to associate with the proxy using a menu interface of the bank application (the user already holding this bank account at bank 1) and then type in the proxy using a real or virtual keyboard of the electronic device 116A. Once this information has been entered, the bank application transmits the information as part of an electronic registration request message to bank 1. This is illustrated in step 120. The information is transmitted to the bank via any suitable method (such as an internet connection), and may be encrypted. Once received by the bank, the registration request message is digitally signed and transmitted to the system 100 via the network 114, as shown in steps 122 and 124.

In addition to the bank account information and the user's chosen proxy, in this embodiment, the user also provides a display name (which acts as an identifier of the user and, as will be explained, is a name to be displayed to a sender of payment to the user) as part of the registration request message. In addition, the user may also provide further auxiliary information as part of the registration request message, such as the name of the bank with which the account is held, whether the user is a person or business and a full name (if the user is a person) or business name (if the user is a business). In fact, any auxiliary information may be added which helps identify the user and/or which may be required from the user for technical, security, legal or convenience reasons). At least some of the information may be added to the registration request message automatically by the bank application.

The registration request message is transmitted over the network 114 to the system 100. More specifically, the registration request message is routed by the network to one of the load balancers 102A-D. For registration request messages, the load balancers are configured to direct all such messages to a particular one of the sites. Advantageously, this leaves all servers at the other site free to process proxy payment request messages, thus helping to ensure that payment requests continue to be processed quickly and efficiently even if there is a large number of registration request messages being processed. In the embodiment of FIG. 1, each of the load balancers is configured to direct registration request messages to site 1. Thus, when the registration request message is received in step 124 by load balancer 102C, the load balancer 102C directs the message to one of the servers 104A or B at site 1. The server 104A or B is chosen by the load balancer 102 C on a least connection basis, for example. In the embodiment of FIG. 1, the load balancer 102C directs the registration request message to server 104B, as shown in step 126.

Once received at the server 104B, the registration request message is processed by the registration application 108B. More specifically, the registration request message is validated using the digital signature so as to ensure that the message has genuinely been received from bank 1 (using any suitable validation method) and assigned a registration identifier (registration ID). The registration ID allows the information contained in the registration request message (registration information) to be uniquely identified when stored as a record in the registration databases 112A-D. The registration application 108B then stores the registration information as a record in the registration database 112B associated with the server 104B, as shown in step 128.

Once stored in the registration database 112B, a subset of the registration information is pushed to the lookup database 110B, as shown in step 130B. The subset of registration information pushed to the lookup database 110B is information necessary for carrying out a payment to the registered bank account of user 1 and is referred to as lookup information. An example of the lookup information stored in the lookup database 110B is shown in FIG. 2, and is discussed later on. Once the lookup information has been stored in the lookup database 110B, an electronic message confirming successful registration of user 1's proxy with their bank account is transmitted back to the electronic device 116A of user 1 via the server 104B, load balancer 102C, network 114 and bank 1 (as illustrated in steps 132, 134, 136, 138 and 140). This confirms to user 1 that they have successfully registered their proxy with the system 100.

Once stored in the registration database 112B, the registration information is shared with the other registration databases 112A, C and D, as illustrated in steps 142A, C and D. This is possible because the registration databases 112A-D and configured to connect with each other under the control of a controller (not shown) so as to share registration information. The sharing of information between the registration databases may be implemented using Oracle® GoldenGate, for example. Furthermore, once each registration database 112A, C and D has received and stored the registration information originally received and stored at registration database 112B, the same lookup information which was pushed to the lookup database 110B is also pushed by each registration database 112A, C and D to its respective lookup database 110A, C and D (so registration database 112A pushes the lookup information to lookup database 110A, registration database 112C pushes the lookup information to lookup database 110C, etc.).

Thus, following successful registration of user 1 at the registration and lookup databases 110B, 112B (which are associated with the server to which the registration request message was originally routed), the registration and lookup information is made available on each registration and lookup server, respectively. The registration and lookup information is therefore available across a plurality of databases distributed amongst a plurality of sites. Advantageously, and as will be explained, this allows proxy payment request messages to be processed by any one of the servers 102A-D, thus improving the resilience and efficiency of the system 100.

User 2 will register their proxy with the system 100 via a banking application of bank 2 (accessible to user 2 via their electronic device 116B) in exactly the same way as user 1. Thus, once user 2 has also registered, the registration information of each of user 1 and user 2 will be stored in each of the registration databases 112A-D and the lookup information of each of user 1 and user 2 will be stored in each of the lookup databases 110A-D. An example of the lookup information stored in each of the lookup databases is illustrated in FIG. 2, in which it can be seen that the lookup information of each user includes the user's display name, proxy and bank account information (in this case, the bank account number and sort code).

Figure 3:
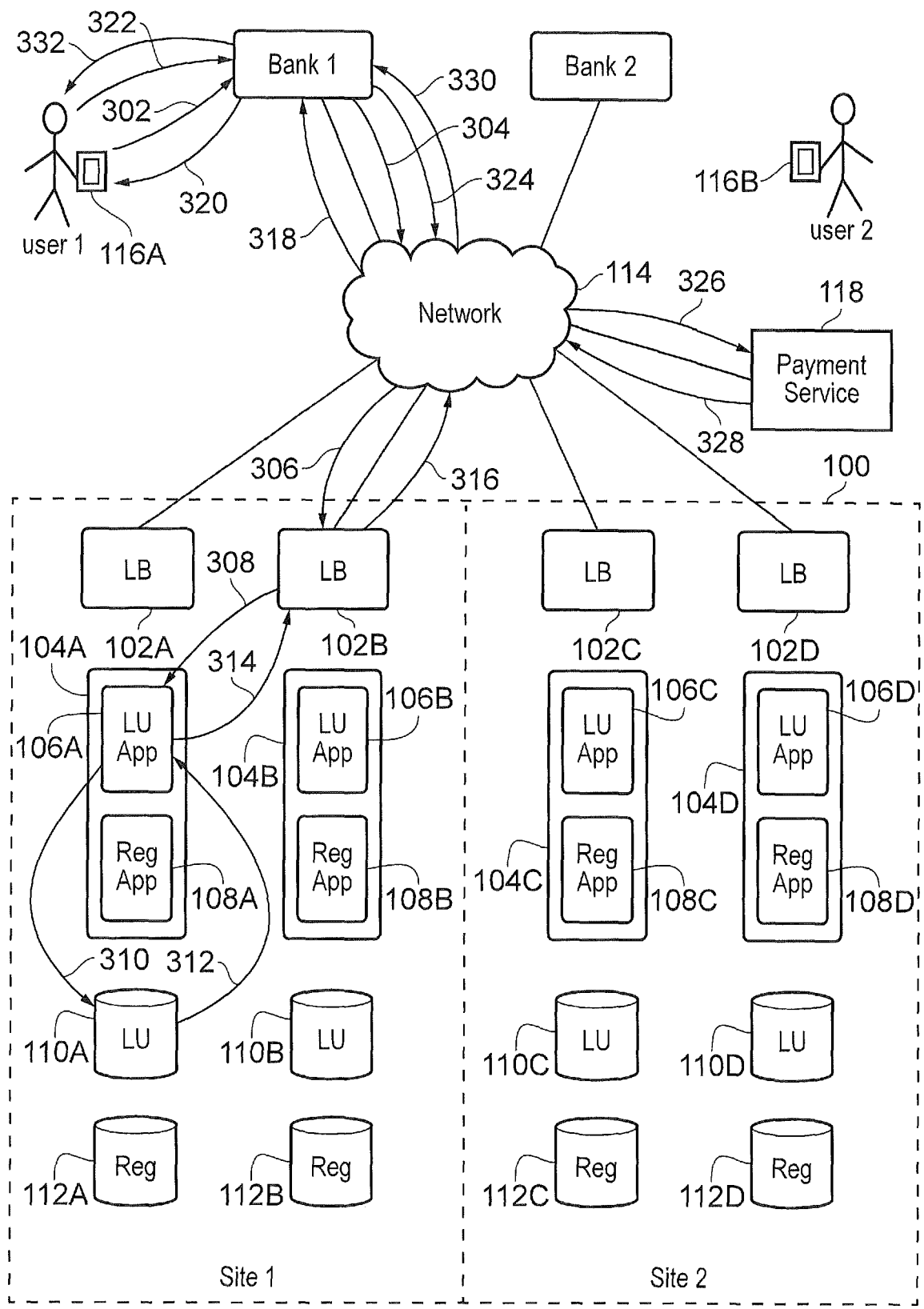
FIG. 3 shows the system and illustrates how a first user may make a payment to a second user, according to an embodiment.

Once both user 1 and user 2 are registered with the system 100, user 1 may make a payment to user 2 (or vice versa) knowing only the proxy of user 2. FIG. 3 illustrates a process by which this occurs, according to an embodiment.

At step 302, user 1 transmits a proxy payment request message to bank 1 using electronic device 116A. The proxy payment request message contains the proxy of user 2 (so, in this embodiment, the registered mobile telephone number of user 2) and the amount of money which user 1 wishes to pay to user 2. Bank 1 digitally signs the proxy payment request message and then transmits it to the system 100 over the network 114 (steps 304 and 306). The proxy payment request message is routed by the network 114 to one of the load balancers 102A-D of the system 100. In the embodiment of FIG. 3, the proxy payment request message is routed to load balancer 102B. The load balancer 102B then transmits the message to one of the servers 104A-D, according to a predetermined distribution method. For example, the least connection method may be used. In the embodiment of FIG. 3, the message is transmitted to server 104A (step 308).

Once received at server 104A, the message is processed by the lookup application 106A. More specifically, the message is verified (using the digital signature) so as to ensure that it has genuinely been received from bank 2. The lookup application then looks up the proxy contained in the proxy payment request message in the lookup database 110A (step 310). Because the registration and lookup information of all registered users is copied across and pushed to all registration and lookup databases, respectively, the registration record of user 2 (including the proxy of user 2) will be present in each of the lookup databases 104A-D. Thus, when the lookup application 106A queries the lookup database 110A on the basis of the proxy of user 2 contained in the proxy payment request message of user 1, it will find the lookup information of user 2. The lookup information of user 2 (as shown in FIG. 2, for example) is therefore returned to the lookup application 106A as a result of the query (step 312).

The lookup information of user 2 is then returned to bank 1 as an electronic message via the load balancer 102B and network (steps 314, 316 and 318). Bank 1 then transmits selected information from the received lookup information of user 2 to user 1 via the bank application and electronic device 116A (step 320). The transmitted information is then displayed to user 1 so that user 1 may identify the party who is to be paid and to confirm the payment. The selected information transmitted and displayed to user 1's electronic device will typically include information such as the display name of user 2 (this being "User 2" in the lookup information shown in FIG. 2) but will not include the bank account information (such as the bank account number and sort code) of user 2. Advantageously, this allows user 1 to identify whether or not they have used the correct proxy for user 2 (since user 2's display name will be displayed to user 1 if the proxy for user 2 was entered correctly) without the need for user 1 to know the bank account information of user 2. The risk of abuse or fraud involving user 2's bank account information is therefore reduced.

If user 1 is happy that the information displayed to them confirms that they have used the correct proxy for user 2, then, using the device 116A and the bank application, they will transmit a message to bank 1 confirming their wish to proceed with the requested payment (step 322). Bank 1 will then issue a payment instruction to electronic payments service 118 over the network (steps 324 and 326). The payment instruction issued by bank 1 will be a conventional payment instruction which identifies the bank account information (such as bank account number and sort code) of user 2. This is possible because this information, although not transmitted and displayed to user 1, is nonetheless known to bank 1 because it is comprised as part of the lookup information transmitted to bank 1 at step 318. In response to the received payment instruction, the electronic payments service will process the payment. Once successfully processed, the electronic payments service 118 will transmit a confirmation message back to bank 1 over the network 114 (steps 328 and 330) indicating the successful processing of the payment. Bank 1 then informs the user (via the bank application and device 116A) that the payment request has been successfully processed. Thus, advantageously, by knowing only the proxy of user 2, user 1 has been able to confirm the identity of user 2 and send an electronic payment to user 2.

It is noted that the proxy payment request message only needs to contain the proxy of user 2 in order for the lookup information of user 2 to be found and returned to user 1. Thus, the proxy payment request message need not necessarily contain information indicating the amount of money which user 1 wishes to pay to user 2 (as is the case in the above described embodiment). The information indicating the amount of money to be paid can then instead be added to the payment instruction sent to the electronics payments server 118 (immediately before step 324 in FIG. 3), for example.

Thus, embodiments of the present invention allow payments to be conducted between registered users of the system 100 using only a proxy such as a mobile telephone number. This results in a more secure and more convenient method of payment, since the need to share sensitive bank account information is avoided. Furthermore, by having a system 100 in which registration and proxy payment request messages are processed in the way described, proxy payment requests messages may be processed by any one of a number of servers 104A-D distributed across a plurality of different sites. This allows large numbers of proxy payment request messages to be processed efficiently (since the load balancers 102A-D will distribute the proxy payment request messages amongst the servers so as to use the server capacity efficiently, as already discussed), and also provides a resilient system (since, for example, if one of the servers or lookup databases experiences a malfunction or experiences down time for scheduled maintenance, then the remaining servers and lookup databases may continue to process messages). The sites amongst which the servers, registration databases and lookup databases are distributed (sites 1 and 2 in FIGS. 1 and 3) may also be physically separate sites, meaning that if there is a fault, natural disaster or the like at one site, then messages can continue to be processed at the remaining, unaffected site. This further improves the resilience of the system.

A further advantage is provided by having separate registration and lookup databases, with the registration database containing all information necessary for a user to be registered with the system 100 (including the auxiliary information, which is not necessary for a proxy payment request message to be processed but which may be necessary for technical, security, legal and/or convenience reasons, such as information indicating whether the user is a business or person) and the lookup database containing only selected information (such as that shown in FIG. 2) necessary for allowing a proxy payment message to be processed (thus allowing payees to be found via their proxy and for allowing payers to confirm the identify of the payee and to initiate payment). By having such an arrangement, processing of received proxy payment request messages (and in particular, the lookup operation) occurs more quickly than if the larger, more complex registration database were used directly, thus improving the speed of the system and allowing lookup information to be returned to the bank of the payer as quickly as possible.

Once a user has registered with the system 100, the registration information stored in the registration database may be updated. For example, a user may wish to change their proxy and/or bank account information (as may occur if, for example, the user changes their telephone number or opens a new bank account).

Registration information may be updated by the user sending an update request message to the system 100 via the bank application and network 114 in exactly the same way as a registration request message or proxy payment request message. In this case, the registration application at the server at which the update request message is received will process the message and implement the change in the registration database.

Alternatively, registration information may be updated directly by a bank. For example, if a user decides to close a particular bank account, then the bank may remove any registration of that account with the system 100 so as to ensure that no attempts are made to pay money into this closed account via the system 100. A bank may update registration information associated with bank accounts held by that bank by sending an update request message (as may be carried out by a user). In this case, the bank essentially transmits the update request message on behalf of the user. Alternatively, a bank may directly obtain access to the registration information associated with accounts held at that bank via a back office unit (not shown in the Figures) which is accessible only to the owner of the system 100 and banks registered to use the system 100. Such an arrangement is possible when each database record of registration information includes an identifier of the bank (such as the bank name or sort code) to which the registered bank account belongs. In this case, the back office unit may, for example, provide a user interface accessible to a person at the bank concerned so as to allow bank accounts held at that bank and registered with the system 100 to be viewed, selected and updated.

Once a registration has been successfully updated, the updates are copied across to all the registration databases and any relevant updates (that is, updates to information which is included in the lookup databases as well as the registration databases, such as the display name, proxy and bank account information) are pushed to the lookup databases so as to update the lookup information. This helps ensure that any updates are taken into account during the processing of a subsequent proxy payment request (no matter which server processes the proxy payment request), and that payments are thus processed on the basis of the most up to date information. Advantageously, because updates to the registration information are carried out by updating the registration database and then pushing any relevant updates to the lookup databases, the lookup databases do not need to be updated directly and no mechanism for updating the lookup databases needs to be implemented. This reduces the complexity associated with the lookup databases and allows the lookup application of each server to quickly look up the relevant lookup information following the receipt of a proxy payment request.

All messages transmitted to the system 100 from the banks via the network 114 (including registration request messages, proxy payment request messages and update request messages) are digitally signed by the bank when transmitted over the network and verified by the registration or lookup application when received over the network. The digital signing and verification may be carried out via the PKCS #7 cryptography standard, for example. This helps to ensure that only messages genuinely sent to the system 100 from participating banks are processed by the system 100. In addition, users must provide secure login credentials when using the bank application and banks must provide secure login credentials when using the back office unit to access and update records in the registration database. This helps to ensure that only authorised parties may create and change records in the registration databases, thus helping to ensure that the system 100 is secure.

Figure 4:
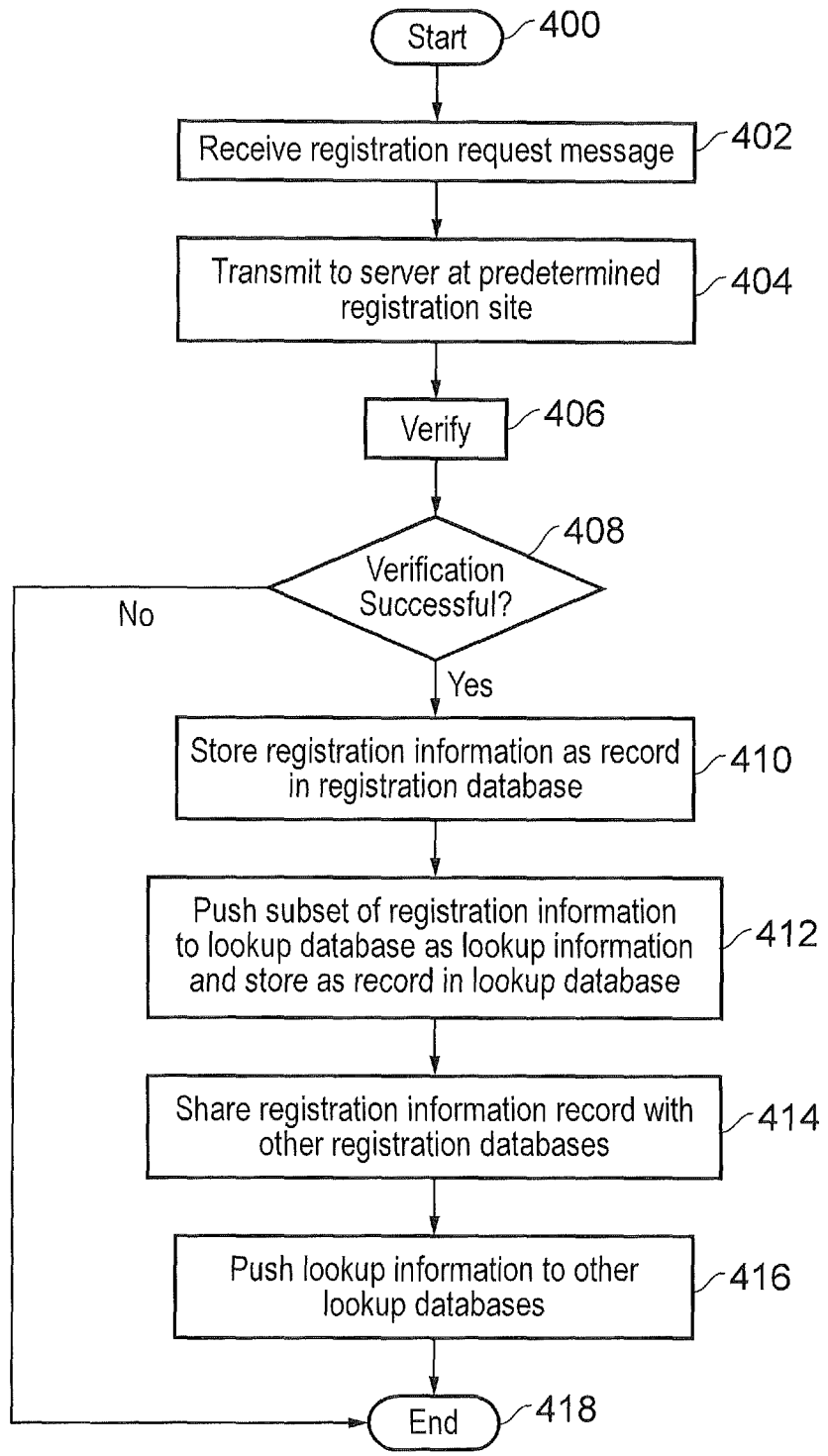
FIG. 4 illustrates an overview of the processing of a registration request message carried out by the system, according to an embodiment.

FIG. 4 illustrates an overview of the processing of a registration request message carried out by the system 100. The process starts at step 400. At step 402, the registration request message is received over the network 114. The registration request message is received at one of the load balancers 102A-D. At step 404, the registration request message is transmitted by the load balancer at which it was received to an appropriate server at the predetermined site for registration request message processing (this being site 1 in the embodiment of FIG. 1). The registration application of the server then verifies the digital signature of the registration request message at step 406, and a check is performed at step 408 to determine whether the verification was successful. If the verification was successful, then it is confirmed that the registration request message has genuinely been received from a participating bank, and the process continues to step 410. On the other hand, if the verification was not successful, then it cannot be confirmed that the registration request message has genuinely been received from a participating bank, and the process ends at step 418.

At step 410, the registration application of the server records the registration information comprised in the registration request message as a record in the registration database associated with the server. At step 412, a subset of the registration information is pushed to the lookup database associated with the registration database as lookup information and stored as a record in the lookup database. At step 414, the registration information is shared with the other registration databases of the system 100 so that each registration database stores a record of the registration information. At step 416, each of the other registration databases then pushes the lookup information to its associated lookup database. Thus, following steps 414 and 416, each registration database of the system 100 contains a record of the registration information and each lookup database of the system 100 contains a record of the lookup information. The process then ends at step 418.

Figure 5:
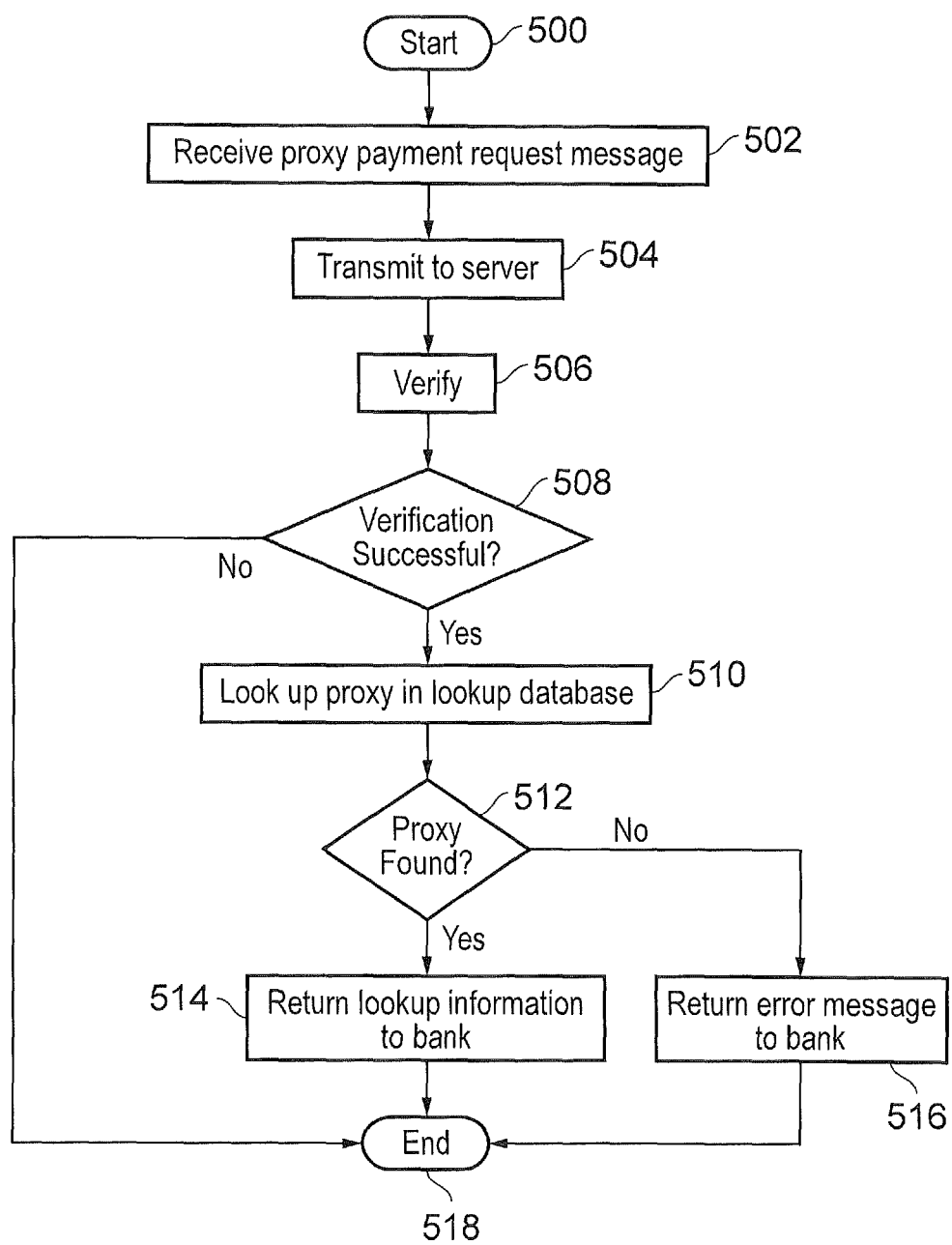
FIG. 5 illustrates an overview of the processing of a proxy payment request message carried out by the system, according to an embodiment.

FIG. 5 illustrates an overview of the processing of a proxy payment request message carried out by the system 100. The process starts at step 500. At step 502, the proxy payment request message is received over the network 114. The proxy payment request message is received at one of the load balancers 102A-D. At step 404, the proxy payment request message is transmitted by the load balancer to an appropriate server. The lookup application of the server then verifies the digital signature of the proxy payment request message at step 506, and a check is performed at step 508 to determine whether the verification was successful. If the verification was successful, then it is confirmed that the proxy payment request message has genuinely been received from a participating bank, and the process continues to step 510. On the other hand, if the verification was not successful, then it cannot be confirmed that the proxy payment request message has genuinely been received from a participating bank, and the process ends at step 518.

At step 510, the lookup application of the server looks up the proxy contained in the proxy payment request message in the lookup database associated with the server. At step 512, it is determined as to whether or not the proxy exists in the lookup database. If the proxy does exist in the lookup database, then the process continues to step 514, in which the lookup information associated with the proxy is returned to the bank from which the proxy payment request message was received over the network 114. The process then ends at step 518. On the other hand, if the proxy does not exist in the lookup database (for example, the proxy may never have been registered, or may have been deactivated by a user or bank), then the process continues to step 516, in which an error message is returned to the bank indicating that the proxy could not be found and is therefore not available for making a payment using the system 100 (this information may then subsequently be provided to the user via the bank application, for example). The process then ends at step 518.

Figure 6:
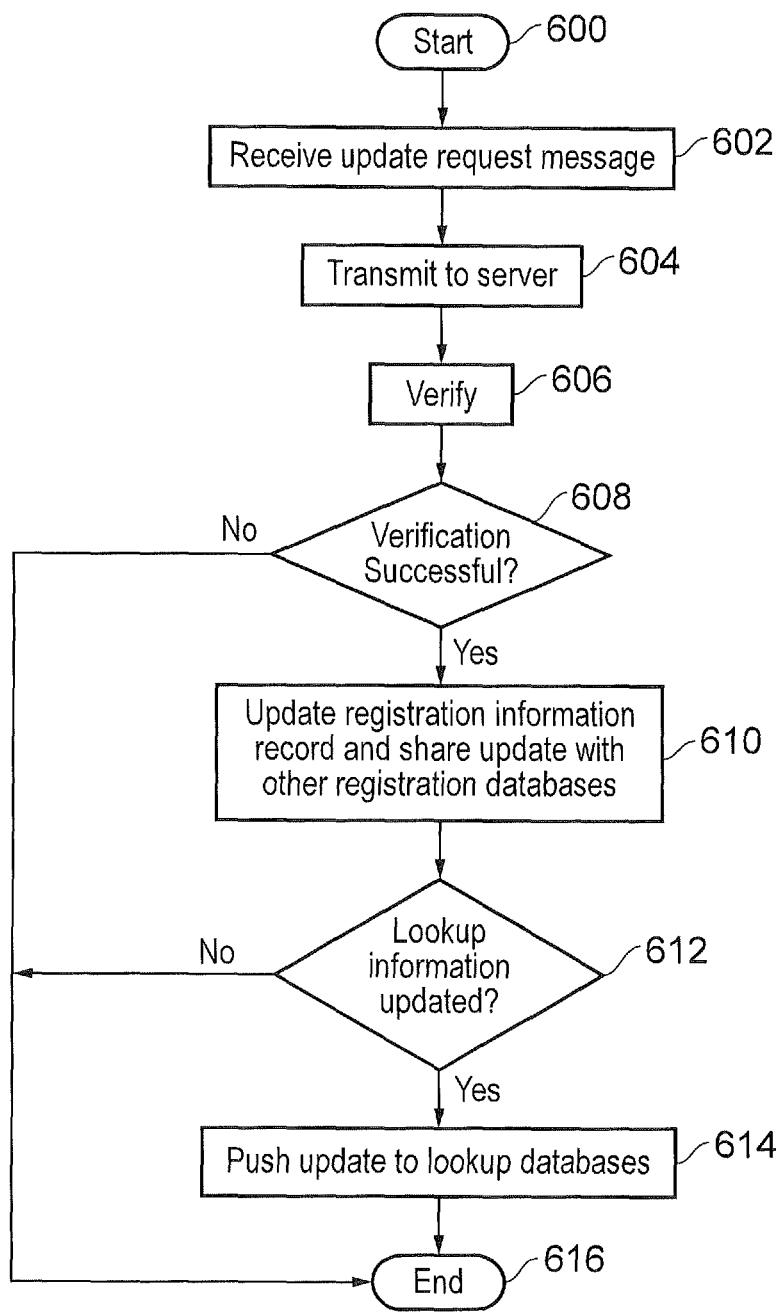
FIG. 6 illustrates an overview of the processing of an update request message carried out by the system, according to an embodiment.

FIG. 6 illustrates an overview of the processing of an update request message carried out by the system 100. The process starts at step 600. At step 602, the update request message is received over the network 114. The update request message is received at one of the load balancers 102A-D. At step 604, the update request message is transmitted by the load balancer to an appropriate server. The registration application of the server then verifies the digital signature of the update request message at step 606, and a check is performed at step 608 to determine whether the verification was successful. If the verification was successful, then it is confirmed that the update request message has genuinely been received from a participating bank, and the process continues to step 610. On the other hand, if the verification was not successful, then it cannot be confirmed that the update request message has genuinely been received from a participating bank, and the process ends at step 616.

At step 610, the registration application of the server updates the record of the registration information identified by the update request message in the registration database associated with the server. This is possible because the update request message contains information which uniquely identifies the registration information record to be updated (for example, the update request message may contain the registration ID of the registration information record). This update is then shared with the other registration databases of the system 100 so that the registration information record in each registration database is up to date. At step 612, it is determined whether any of the updated registration information corresponds to lookup information (so, for example, if the lookup information is that exemplified in FIG. 2, it is determined whether the display name, proxy, bank account number or sort code has been updated). If yes, then the process continues to step 614, in which each registration database pushes the update to its associated lookup database. The process then ends at step 616. If not, then the process simply ends at step 616. Thus, the process of FIG. 6 helps ensure that updates requested by a registered user are applied to each registration database of the system 100 and, if necessary, each lookup database of the system 100.

It is noted that if a registration information record is updated directly by a bank (via a back office unit, as explained above), then steps 600, 602, 604 and 606 are not carried out but are instead replaced with the provision of secure login credentials by the bank. Once a bank has successfully logged in using these credentials, the update steps 610, 612, 614 are carried out on one or more registration information records identified by the bank as part of the direct update process.

Figure 7:
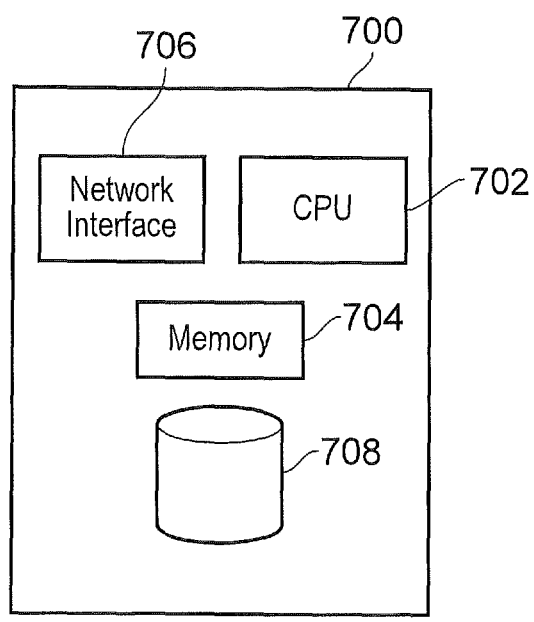
FIG. 7 illustrates a computer for use with the system, according to an embodiment.

FIG. 7 illustrates a computer 700 for use with the system 100. In an embodiment, the functions carried out by each element of the system 100 (including the load balancers 102A-D, servers 104A-D, lookup databases 110A-D, registration databases 112A-D, back office unit (for allowing banks to update registration information records directly, as explained above) and controller (for controlling the transfer of registration information between the registration databases, as explained above)) may be implemented by one or more such computers 700. These computers may also be servers (which themselves may be physical servers or may be virtual servers). The computer 700 is controlled by central processing unit (CPU) 702, the CPU 702 being configured to process instructions held in memory 704. Data communication with the computer 700 occurs via the network interface 706. The computer 700 also comprises a storage medium 708 (such as a hard disk drive, solid state memory or tape drive) for storing data.

It will be appreciated that, although the Figures show two banks, two sites and two servers, registration databases and lookup databases for each site, embodiments of the invention are not limited to this. In reality, there may be a large number of banks configured to use the system 100. There may also be more than two sites, with each additional site configured in the same way as sites 1 and 2. Furthermore, each site may comprise more than two servers (with each additional server having an associated lookup database and registration database in the same way as described for the servers 104A-D of the Figures). The skilled person will appreciate how the system 100 as described with reference to the Figures could be extended so as to include larger numbers of banks, sites, servers, lookup databases and registration databases).

It is noted that although the above embodiments use banks as an example of participants of the system 100, any other suitable financial institution which provides accounts to users to and/or from which money can be paid may also be a participant of the system 100.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A system for allowing electronic payments through use of a unique proxy, the system comprising a first server, a first registration database and a first lookup database, wherein:
   the first server is operable to:

receive an electronic registration request message from a financial institution of a first user, the electronic registration request message comprising registration information of the first user including bank account information identifying a bank account of the first user, an identifier of the first user, a unique proxy of the first user, and auxiliary information associated with the first user; and store the registration information of the first user in the first registration database;

the first registration database is operable to copy a subset of the registration information of the first user to the first lookup database as lookup information of the first user, the lookup information including the bank account information of the first user, the identifier of the first user and the unique proxy of the first user; and the first server is operable to further:
receive an electronic proxy payment request message from a financial institution of a second user, the electronic proxy payment request message comprising the unique proxy of the first user;
identify the lookup information of the first user in the first lookup database using the unique proxy of the first user comprised within the electronic proxy payment request message; and
transmit the lookup information of the first user to the financial institution of the second user.

2. The system according to claim 1, wherein the first registration database is operable to further:
update a portion of the registration information of the first user in response to an update instruction received from the financial institution of the first user; and
if the portion of the registration information of the first user which is updated is also a portion of the lookup information, perform a corresponding update to the lookup information.

3. The system according to claim 1, further comprising one or more second servers, one or more second registration databases each associated with a respective one of the one or more second servers, one or more second lookup databases each associated with a respective one of the one or more second servers and a respective one of the one or more second registration databases, and a routing unit, wherein:
the first registration database is operable to copy the registration information of the first user to each of the one or more second registration databases;
each second registration database is operable to copy the subset of the registration information of the first user corresponding to the lookup information to the second lookup database associated with that second registration database;
each second server is operable to:
receive the electronic proxy payment request message from the financial institution of the second user, the electronic proxy payment request message comprising the unique proxy of the first user;
identify the lookup information of the first user in the second lookup database associated with that second server using the unique proxy of the first user comprised within the electronic proxy payment request message; and
transmit the lookup information of the first user to the financial institution of the second user; and
the routing unit is operable route the electronic proxy payment request message from the financial institution of the second user to either the first server or one of the one or more second servers.

4. The system according to claim 3, wherein:
at least one of the second servers is operable to:
receive the electronic registration request message from the financial institution of the first user; and
store the registration information of the first user in the second registration database associated with that second server;
the second registration database in which the received registration information of the first user is stored is operable to copy the registration information of the first user to the first registration database and to each of any other of the one or more second registration databases;
the first registration database is further operable to copy the subset of the registration information of the first user corresponding to the lookup information to the first lookup database and each second registration database is operable to copy the subset of the registration information of the first user corresponding to the lookup information to the second lookup database associated with that second registration database; and
the routing unit is further operable route the electronic registration request message from the financial institution of the first user to either the first server or one of the second servers.

5. The system according to claim 3, wherein:
the first registration database is operable to:
update a portion of the registration information of the first user in response to an update instruction received from the financial institution of the first user; and
copy the updated portion of the registration information of the first user to each of the one or more second registration databases; and
if the portion of the registration information of the first user which is updated is also a portion of the lookup information, the first registration database is operable to perform a corresponding update to the lookup information stored in the first lookup database and each second registration database is operable to perform a corresponding update to the lookup information stored in the second lookup database associated with that second registration database.

6. The system according to claim 3, wherein:
at least one of the second registration databases is operable to:
update a portion of the registration information of the first user in response to an update instruction received from the financial institution of the first user; and
copy the updated portion of the registration information of the first user to the first registration database and to each of any other of the one or more second registration databases; and
if the portion of the registration information of the first user which is updated is also a portion of the lookup information, the first registration database is operable to perform a corresponding update to the lookup information stored in the first lookup database and each second registration database is operable to perform a corresponding update to the lookup information stored in the second lookup database associated with that second registration database.

7. The system according to claim 3, wherein the routing of the electronic proxy payment request message from the financial institution of the second user to either the first server or one of the second servers comprises routing the electronic proxy payment request message to a server having a largest capacity to process the electronic proxy payment request message.

8. The system according to claim 4, wherein the routing of the electronic registration request message from the financial institution of the first user to either the first server or one of the second servers comprises routing the electronic registration request message to a server having a largest capacity to process the electronic registration request message.

9. The system according to claim 3, wherein the first server, the first registration database, and the first lookup database and the one or more second servers, the one or more second registration databases, and the one or more second lookup databases are distributed across a plurality of physically separate sites.

10. The system according to claim 1, wherein the unique proxy of the first user is a mobile telephone number.

11. A method for allowing electronic payments through use of a unique proxy, the method comprising:
receiving, at a first server, an electronic registration request message from a financial institution of a first user, the electronic registration request message comprising registration information of the first user including bank account information identifying a bank account of the first user, an identifier of the first user, a unique proxy of the first user, and auxiliary information associated with the first user;
storing the registration information of the first user in a first registration database associated with the first server;
copying a subset of the registration information of the first user in the first registration database to a first lookup database associated with the first server as lookup information of the first user, the lookup information including the bank account information of the first user, the identifier of the first user and the unique proxy of the first user;
receiving, at the first server, an electronic proxy payment request message from a financial institution of a second user, the electronic proxy payment request message comprising the unique proxy of the first user;
identifying the lookup information of the first user in the first lookup database using the unique proxy of the first user comprised within the electronic proxy payment request message; and
transmitting the lookup information of the first user to the financial institution of the second user.

12. The method of claim 11, further comprising:
updating a portion of the registration information of the first user in response to an update instruction received from the financial institution of the first user; and
if the portion of the registration information of the first user which is updated is also a portion of the lookup information, performing a corresponding update to the lookup information.

13. The method according to claim 11, further comprising:
for each of one or more second registration databases:
copying the registration information of the first user to that second registration database;
copying the subset of the registration information of the first user corresponding to the lookup information to a second lookup database of one or more second lookup databases associated with that second registration database;
wherein each of the one or more second registration databases is associated with a respective one of one or more second servers and each of the one or more second lookup databases is associated with a respective one of one or more second servers and a respective one of the one or more second registration databases;
receiving, at a second server of the one or more second servers, the electronic proxy payment request message from the financial institution of the second user, the electronic proxy payment request message comprising the unique proxy of the first user;
identifying the lookup information of the first user in the second lookup database associated with that second server using the unique proxy of the first user comprised within the electronic proxy payment request message;
transmitting the lookup information of the first user to the financial institution of the second user; and
routing the electronic proxy payment request message from the financial institution of the second user to either the first server or one of the one or more second servers.

14. The method of claim 13, further comprising:
receiving, at the second server of the one or more second servers, the electronic registration request message from the financial institution of the first user;
storing the registration information of the first user in the second registration database associated with that second server;
copying the registration information of the first user to the first registration database and to each of any other of the one or more second registration databases;
copying the subset of the registration information of the first user corresponding to the lookup information to the first lookup database;
copying, from each of the one or more second registration databases, the subset of the registration information of the first user corresponding to the lookup information to the second lookup database associated with that second registration database; and
routing the electronic registration request message from the financial institution of the first user to either the first server or one of the one or more second servers.

15. The method of claim 13 further comprising:
updating a portion of the registration information of the first user stored in the first registration database in response to an update instruction received from the financial institution of the first user;
copying the updated portion of the registration information of the first user to each of the one or more second registration databases; and
if the portion of the registration information of the first user which is updated is also a portion of the lookup information:
updating the portion of the lookup information stored in the first lookup database; and
for each of the one or more second registration databases, updating the portion of the lookup information stored in the second lookup database associated with that second registration database.

16. The method of claim 13, further comprising:
updating a portion of the registration information of the first user stored in at least one of the one or more registration databases in response to an update instruction received from the financial institution of the first user;

copying the updated portion of the registration information of the first user to the first registration database and to each of any other of the one or more second registration databases; and if the portion of the registration information of the first user which is updated is also a portion of the lookup information:

updating the lookup information stored in the first lookup database; and for each of the one or more second registration databases, updating the lookup information stored in the second lookup database associated with that second registration database.

17. The method of claim 13, wherein the routing of the electronic proxy payment request message comprises:

routing the electronic proxy payment request message from the financial institution of the second user to a server having a largest capacity to process the electronic proxy payment request message.

18. The method of claim 14, wherein the routing of the electronic registration request message comprises:

routing the electronic registration request message from the financial institution of the first user to a server having a largest capacity to process the electronic registration request message.

19. The method of claim 13, wherein the first server, the first registration database, and the first lookup database and the one or more second servers, one or more second registration databases, and one or more second lookup databases are distributed across a plurality of physically separate sites.

20. The method of claim 11, wherein the unique proxy of the first user is a mobile telephone number.

\* \* \* \* \*